United States Patent
Morimoto (10) Patent No.: US 10,697,525 B2
(45) Date of Patent: Jun. 30, 2020

(54) HYDRAULIC AUTO-TENSIONER

(71) Applicant: NTN CORPORATION, Osaka (JP)

(72) Inventor: Hiroo Morimoto, Shizuoka (JP)

(73) Assignee: NTN CORPORATION, Osaka (JP)

( * ) Notice: Subject to any disclaimer, the term of this patent is extended or adjusted under 35 U.S.C. 154(b) by 229 days.

(21) Appl. No.: 15/770,975

(22) PCT Filed: Oct. 14, 2016

(86) PCT No.: PCT/JP2016/080532
§ 371 (c)(1),
(2) Date: Apr. 25, 2018

(87) PCT Pub. No.: WO2017/073368
PCT Pub. Date: May 4, 2017

(65) Prior Publication Data
US 2018/0306281 A1    Oct. 25, 2018

(30) Foreign Application Priority Data

Oct. 26, 2015  (JP) ................. 2015-210098

(51) Int. Cl.
*F16H 7/08*    (2006.01)
*F16H 7/12*    (2006.01)

(52) U.S. Cl.
CPC ............. *F16H 7/0836* (2013.01); *F16H 7/12* (2013.01); *F16H 2007/0806* (2013.01);
(Continued)

(58) Field of Classification Search
CPC ..... F16H 2007/0806; F16H 2007/0859; F16H 2007/0891; F16H 7/0848; F16H 2007/0812
(Continued)

(56) References Cited

U.S. PATENT DOCUMENTS 4,790,796 A * 12/1988 Okabe ................ F16H 7/08
474/110
4,790,801 A * 12/1988 Schmidt ............ F16H 7/1236
474/110
(Continued)

FOREIGN PATENT DOCUMENTS

EP    2 381 131    10/2011
JP    2006-266377    10/2006
(Continued)

OTHER PUBLICATIONS

Extended European Search Report dated Sep. 18, 2018 in European Application No. 16859598.1.
(Continued)

*Primary Examiner* — Henry Y Liu
(74) *Attorney, Agent, or Firm* — Wenderoth, Lind & Ponack, L.L.P.

(57) ABSTRACT

A hydraulic auto-tensioner includes a sleeve; a rod vertically movable relative to the sleeve; a spring seat fixed to the portion of the rod protruding beyond the sleeve; a return spring configured to bias the spring seat upwardly; oil passages through which a pressure chamber communicate with a reservoir chamber; a check valve mounted to the oil passages; a tubular plunger vertically movably mounted between the outer periphery of the rod and the inner periphery of the sleeve; a first leakage gap defined between the inner periphery of the tubular plunger and the outer periphery of the rod; an upper stopper configured to restrict the upwardly movable range of the tubular plunger; and a pressure regulating spring disposed above the tubular plunger so as to surround the outer periphery of the rod.

16 Claims, 4 Drawing Sheets

(52) U.S. Cl.
CPC ............... *F16H 2007/0812* (2013.01); *F16H 2007/0859* (2013.01); *F16H 2007/0891* (2013.01)

(58) Field of Classification Search
USPC ........................................................ 474/110
See application file for complete search history.

(56) References Cited

U.S. PATENT DOCUMENTS

| | | | | |
|---|---|---|---|---|
| 4,798,563 A * | 1/1989 | Okabe | F16H 7/1236 | 474/110 |
| 4,940,447 A * | 7/1990 | Kawashima | F16F 13/00 | 474/110 |
| 4,950,209 A * | 8/1990 | Kawashima | F16H 7/1236 | 474/110 |
| 4,986,796 A * | 1/1991 | Kawashima | F16H 7/1236 | 474/101 |
| 4,997,410 A * | 3/1991 | Polster | F16H 7/0836 | 474/110 |
| 5,073,149 A * | 12/1991 | Maruyama | F16H 7/08 | 474/104 |
| 5,181,889 A * | 1/1993 | Maruyama | F16H 7/1236 | 474/110 |
| 5,383,813 A * | 1/1995 | Odai | F16H 7/129 | 474/110 |
| 5,482,262 A * | 1/1996 | Hayakawa | F16H 7/1236 | 267/226 |
| 5,586,952 A * | 12/1996 | Izutsu | F16H 7/0848 | 474/110 |
| 5,637,047 A * | 6/1997 | Schulze | F16H 7/0848 | 474/110 |
| 5,653,651 A * | 8/1997 | Kawashima | F16H 7/0848 | 474/110 |
| 5,658,212 A * | 8/1997 | Meurer | F16H 7/0838 | 474/110 |
| 5,702,315 A * | 12/1997 | Sakai | F16H 7/1227 | 474/110 |
| 5,720,684 A * | 2/1998 | Mott | F16H 7/0848 | 474/101 |
| 5,785,619 A * | 7/1998 | Nakakubo | F16H 7/08 | 474/109 |
| 5,833,220 A * | 11/1998 | Nakakubo | F16H 7/08 | 267/226 |
| 5,961,410 A * | 10/1999 | Yamamoto | F01L 1/02 | 474/110 |
| 6,036,612 A * | 3/2000 | Katogi | F16H 7/0848 | 474/101 |
| 6,106,424 A * | 8/2000 | Kratz | F16H 7/0836 | 474/110 |
| 6,234,929 B1 * | 5/2001 | Rasche | F16H 7/0836 | 474/110 |
| 7,037,229 B2 * | 5/2006 | Hayakawa | F01L 1/02 | 474/101 |
| 7,223,190 B2 * | 5/2007 | Yoshida | F16H 7/0831 | 474/109 |
| 7,241,239 B2 * | 7/2007 | Tanaka | F16H 7/0836 | 474/101 |
| 7,686,717 B2 * | 3/2010 | Grunau | F16H 7/0848 | 474/109 |
| 7,775,922 B2 * | 8/2010 | Tanaka | F16C 33/74 | 474/110 |
| 8,100,792 B2 * | 1/2012 | Kawahara | F16H 7/1236 | 474/109 |
| 8,323,137 B2 * | 12/2012 | Hartmann | F16H 7/0836 | 474/110 |
| 8,814,734 B2 * | 8/2014 | Perissinotto | F16H 7/0836 | 474/110 |
| 2004/0087398 A1 * | 5/2004 | Tanaka | F16H 7/0836 | 474/110 |
| 2005/0064970 A1 * | 3/2005 | Tanaka | F16H 7/0836 | 474/110 |
| 2005/0130777 A1 * | 6/2005 | Grunau | F16H 7/0848 | 474/110 |
| 2007/0155554 A1 * | 7/2007 | Mineno | F16H 7/1236 | 474/110 |
| 2008/0020876 A1 * | 1/2008 | Tanaka | F16C 33/74 | 474/110 |
| 2010/0087284 A1 * | 4/2010 | Norimatsu | F16H 7/0836 | 474/110 |
| 2010/0099528 A1 * | 4/2010 | Hartmann | F16H 7/0836 | 474/110 |
| 2010/0120564 A1 * | 5/2010 | Hartmann | F16H 7/1236 | 474/110 |
| 2010/0181518 A1 * | 7/2010 | Kowalski | F16F 9/3485 | 251/324 |
| 2010/0267503 A1 * | 10/2010 | Hartmann | F16H 7/0836 | 474/110 |
| 2011/0012045 A1 * | 1/2011 | Schaefer | F16H 7/0836 | 251/337 |
| 2011/0207567 A1 * | 8/2011 | Kaiser | F16H 7/0836 | 474/110 |
| 2012/0024249 A1 * | 2/2012 | Fuhrmann | F01L 1/024 | 123/90.57 |
| 2012/0090457 A1 * | 4/2012 | Kowalski | F16H 7/0836 | 91/468 |
| 2013/0260931 A1 * | 10/2013 | Sato | F16H 7/12 | 474/110 |
| 2014/0057748 A1 * | 2/2014 | Satomura | F16H 7/1236 | 474/110 |
| 2014/0378253 A1 * | 12/2014 | Tanaka | F16H 7/1236 | 474/110 |
| 2015/0252878 A1 * | 9/2015 | Kitano | F16H 7/0836 | 474/101 |
| 2016/0230854 A1 * | 8/2016 | Kitano | F16H 7/1236 | |
| 2017/0045120 A1 * | 2/2017 | Yokoyama | F16H 7/0829 | |
| 2018/0017142 A1 * | 1/2018 | Mochizuki | F16H 7/0836 | |

FOREIGN PATENT DOCUMENTS

| | | |
|---|---|---|
| JP | 2009-275757 | 11/2009 |
| JP | 2015-068352 | 4/2015 |
| JP | 2015-135186 | 7/2015 |
| JP | 2015-155718 | 8/2015 |

OTHER PUBLICATIONS

Translation of International Preliminary Report on Patentability dated May 1, 2018 in International (PCT) Application No. PCT/JP2016/080532.

International Search Report dated Nov. 22, 2016 in International (PCT) Application No. PCT/JP2016/080532.

* cited by examiner

HYDRAULIC AUTO-TENSIONER

TECHNICAL FIELD

The present invention relates to a hydraulic auto-tensioner mainly used to maintain the tension of a belt for driving engine accessories, such as an alternator and a water pump.

BACKGROUND ART

In order to reduce the emission of carbon dioxide, an increasing number of today's vehicles have an idle-stopping function, i.e., the function of stopping the engine when the vehicle stops, and restarting the engine to move the vehicle again. Among such vehicles, vehicles equipped with an integrated starter generator (ISG) are especially gathering attention, because the ISG is capable of quietly restarting the engine, and also capable of regenerative braking.

An ISG is one of the automobile engine accessories, and functions as a generator to generate electricity from the driving force of a crankshaft while the engine is running in a steady operation, and as an electric motor (starter) to forcibly rotate the crankshaft, kept at a standstill, to start the engine.

Figures 5, 6:
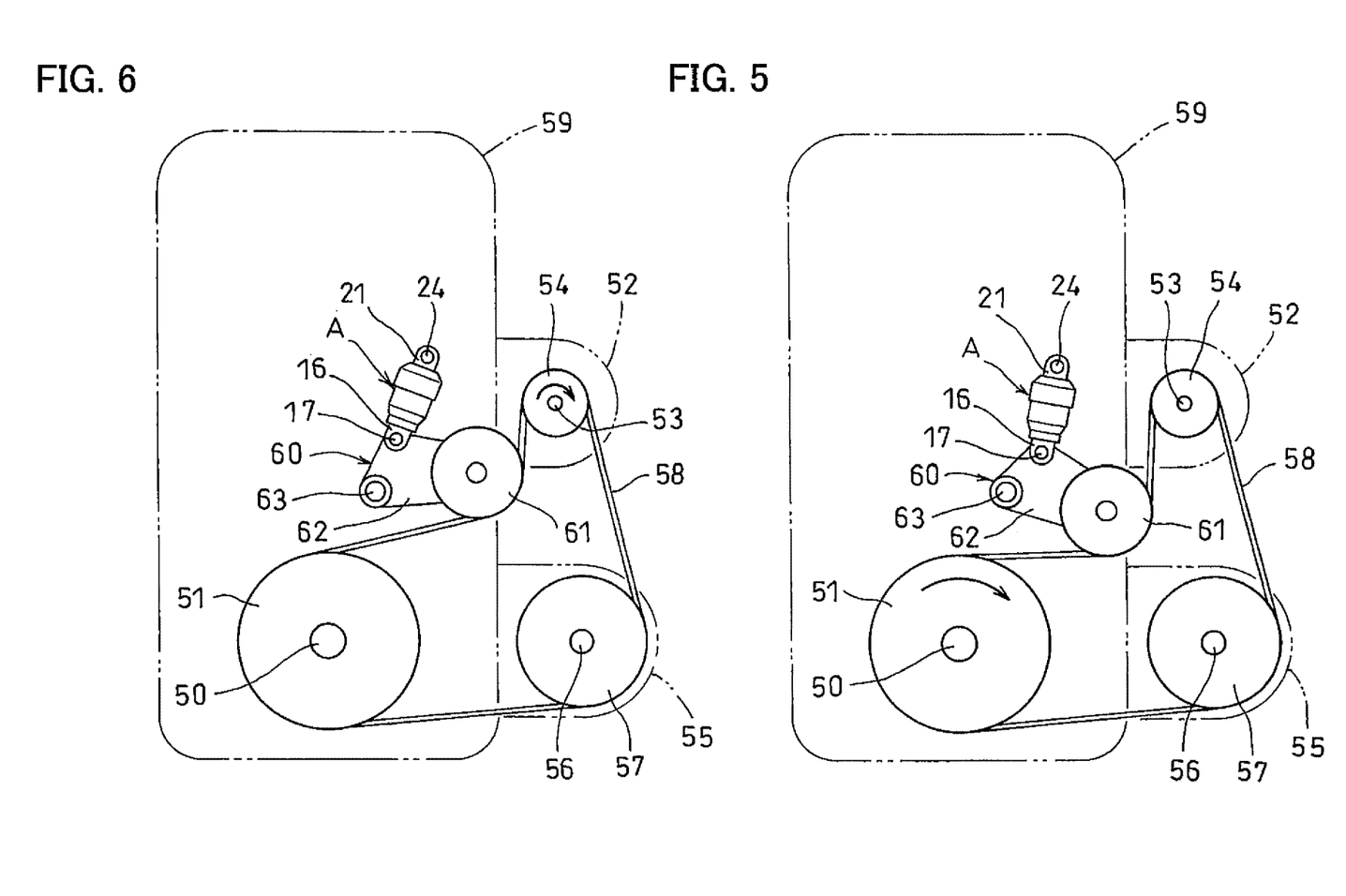
FIG. 5 is a view illustrating a belt transmission device for a vehicle equipped with an ISG with a crankshaft rotating as a driving shaft during the steady operation of the engine.
FIG. 6 is a view illustrating the belt transmission device for a vehicle equipped with an ISG, in which the engine is started by the rotary shaft of the ISG rotating as a driving shaft.

FIGS. 5 and 6 exemplify a belt transmission device for a vehicle equipped with an ISG. This belt transmission device includes a crank pulley 51 mounted to a crankshaft 50; an ISG pulley 54 mounted to the rotary shaft 53 of the ISG 52; an engine accessory pulley 57 mounted to the rotary shaft 56 of an engine accessory 55 such as a water pump; a belt 58 trained around these pulleys 51, 54 and 57; and a tension adjusting device 60 for keeping the tension of the belt 58 in an appropriate range.

The tension adjusting device 60 includes a tension pulley 61 kept in contact with the belt 58 on the downstream side of the crank pulley 51 and on the upstream side of the ISG pulley 54; a pulley arm 62 supporting the tension pulley 61; and a hydraulic auto-tensioner A configured to bias the pulley arm 62 in the direction in which the tension pulley 61 is pressed against the belt 58. One end of the hydraulic auto-tensioner A is coupled to the pulley arm 62, and the other end of the hydraulic auto-tensioner A is coupled to an engine block 59. The pulley arm 62 is supported to be pivotable about a fulcrum shaft 63 fixed to the engine block 59.

As illustrated in FIG. 5, while the engine is running in a steady operation, the crankshaft 50 rotates as a driving shaft such that the rotation of the crankshaft 50 is transmitted through the belt 58 to the pulleys 54 and 57, thereby rotating the rotary shaft 53 of the ISG 52, and the rotary shaft 56 of the engine accessory 55. At this time, the portion of the belt 58 where the tension adjusting device 60 is located is being pushed out from the driving pulley (crank pulley 51), and thus becomes the loose side of the belt 58.

On the other hand, as illustrated in FIG. 6, when restarting the engine after the idle stop, the rotary shaft 53 of the ISG 52 rotates as a driving shaft such that the rotation of the rotary shaft 53 is transmitted through the belt 58 to the pulley 51, thereby rotating the crankshaft 50. At this time, the portion of the belt 58 where the tension adjusting device 60 is located is being pulled by the driving pulley (ISG pulley 54), and thus becomes the tension side of the belt 58.

Since, as described above, a belt transmission device equipped with an ISG is configured such that the crank pulley 51 functions as a driving pulley while the engine is running in a steady operation, and the ISG pulley 54 functions as a driving pulley when the engine is started by driving the ISG, the portion of the belt 58 with which the tension pulley 61 of the tension adjusting device 60 is in contact becomes the loose side of the belt 58 while the engine is running in a steady operation, and becomes the tension side of the belt 58 when the engine is started by driving the ISG.

Japanese Unexamined Patent Application Publication No. 2009-275757 (JP '757) discloses a hydraulic auto-tensioner used to maintain the tension of a belt for driving engine accessories, and including a vertically extending sleeve; a rod vertically movably inserted in the sleeve; a spring seat fixed to the top end of the rod; and a return spring configured to bias the spring seat upwardly. The return spring moves the rod, relative to the sleeve, to the position at which the tension of the belt are equal in strength to the biasing force of the return spring, thereby applying initial tension to the belt.

The hydraulic auto-tensioner of JP '757 further includes, as a mechanism for generating a damping load, a pressure chamber defined inside of the sleeve such that the volume of the pressure chamber increases as the rod moves upwardly relative to the sleeve, and such that the volume of the pressure chamber decreases as the rod moves downwardly relative to the sleeve; a reservoir chamber defined outside of the sleeve; oil stored in the pressure chamber and the reservoir chamber; oil passages through which the lower portion of the pressure chamber communicates with the lower portion of the reservoir chamber; a check valve allowing oil to flow, through the oil passages, only from the reservoir chamber to the pressure chamber; and a leakage gap defined between the inner periphery of the sleeve and the outer periphery of the rod.

When the tension of the belt decreases, the rod moves upwardly relative to the sleeve, thereby absorbing the looseness of the belt. At this time, since the pressure in the pressure chamber falls below the pressure in the reservoir chamber, and thus the check valve opens, oil flows from the reservoir chamber to the pressure chamber through the oil passages, thereby enabling the rod to move in a smooth manner.

On the other hand, when the tension of the belt increases, the rod moves downwardly relative to the sleeve, thereby absorbing the tension of the belt. At this time, since the pressure in the pressure chamber increases, and thus the check valve closes, no oil flows in the oil passages, and oil in the pressure chamber flows out through the leakage gap, which is defined between the inner periphery of the sleeve and the outer periphery of the rod, so that a damping load is generated due to the viscous resistance of the oil flowing in the leakage gap.

If the above-described conventional hydraulic auto-tensioner of JP '757 is used in the belt transmission device in FIGS. 5 and 6, which is a device for a vehicle equipped with an ISG, it is difficult to obtain an optimum damping load both while the engine is running in a steady operation, and when the engine is started by driving the ISG.

Namely, in a belt transmission device for a vehicle equipped with an ISG, as described above, the portion of the belt which becomes the loose side of the belt while the engine is running in a steady operation becomes the tension side of the belt when the engine is started by driving the ISG.

Therefore, if the magnitude of the damping load generated in the hydraulic auto-tensioner is set to be suitable for the steady operation of the engine, when the engine is started by driving the ISG, the hydraulic auto-tensioner will be excessively pushed and contracted, thereby generating slippage between the pulleys and the belt. This might cause the belt to squeal and/or shorten its service life, and also might make it impossible to start the engine in the worst case.

On the other hand, if the magnitude of the damping load generated in the hydraulic auto-tensioner is set to be suitable for when the engine is started by driving the ISG, the tension of the belt will be unnecessarily large while the engine is running in a steady operation. This will cause large energy loss due to the friction between the belt and the pulleys, thus increasing the fuel consumption of the engine.

It is an object of the present invention to provide a hydraulic auto-tensioner used in a belt transmission device for a vehicle equipped with an ISG that is capable of keeping the tension of the belt low while the engine is running in a steady operation, and effectively preventing the slippage of the belt when the engine is started by driving the ISG.

SUMMARY OF THE INVENTION

In order to achieve the above-mentioned object, the present invention provides a hydraulic auto-tensioner comprising: a sleeve which extends in a vertical direction; a rod having a lower portion inserted in the sleeve, and an upper protruding portion protruding beyond the sleeve, the rod being vertically movable relative to the sleeve; a spring seat fixed to the upper protruding portion of the rod; return spring configured to bias the spring seat upwardly; a pressure chamber defined in the sleeve such that a volume of the pressure chamber increases as the rod moves upwardly relative to the sleeve, and such that the volume of the pressure chamber decreases as the rod moves downwardly relative to the sleeve; a reservoir chamber defined outside of the sleeve; oil stored in the pressure chamber and the reservoir chamber; an oil passage through which a lower portion of the pressure chamber communicates with a lower portion of the reservoir chamber; a check valve configured to allow oil to flow, through the oil passage, only from the reservoir chamber to the pressure chamber; a tubular plunger vertically movably mounted between an outer periphery of the rod and an inner periphery of the sleeve such that the volume of the pressure chamber increases as the tubular plunger moves upwardly relative to the sleeve, and such that the volume of the pressure chamber decreases as the tubular plunger moves downwardly relative to the sleeve; a first leakage gap defined between an inner periphery of the tubular plunger and the outer periphery of the rod; an upper stopper configured to restrict an upwardly movable range of the tubular plunger relative to the rod; and a pressure regulating spring disposed above the tubular plunger so as to surround the outer periphery of the rod, and configured to bias the tubular plunger downwardly.

With this arrangement, when the rod moves downwardly relative to the sleeve, oil in the pressure chamber flows out through the first leakage gap, and a damping load is generated due to the viscous resistance of the oil flowing in the first leakage gap. Right after the rod begins to move downwardly relative to the sleeve, the pressure in the pressure chamber begins to increase. However, when the rod moves further downwardly relative to the sleeve, the upward pressure applied to the tubular plunger from the oil in the pressure chamber exceeds the downward biasing force applied to the tubular plunger from the pressure regulating spring, and thus the tubular plunger moves upwardly relative to the rod, thereby absorbing the pressure increase in the pressure chamber. If the hydraulic auto-tensioner is used in the belt transmission device for a vehicle equipped with an TSG, during the steady operation of the engine during which the rod is displaced at a relatively small amplitude, it is possible to keep small the damping load generated in the hydraulic auto-tensioner, and thus to keep the tension of the belt small.

On the other hand, when the rod is rapidly pushed into the sleeve, the tubular plunger moves to the upper limit of the movable range of the tubular plunger relative to the rod. At this time, since any further upward movement of the tubular plunger relative to the rod is restricted, it is impossible to absorb the pressure increase in the pressure chamber. Therefore, by using the hydraulic auto-tensioner in a belt transmission device for a vehicle equipped with an ISG, when the rod is rapidly pushed into the sleeve, a large damping load is generated in the hydraulic auto-tensioner, thus effectively preventing the slippage of the belt.

It is preferable that the upper stopper and the tubular plunge constitute an on-off valve configured to open the first leakage gap when the tubular plunger is separated from the upper stopper, and close the first leakage gap when the tubular plunger is in abutment with the upper stopper.

Such an on-off valve closes the first leakage gap between the inner periphery of the tubular plunger and the outer periphery of the rod, when the tubular plunger moves to the upper limit of the movable range of the tubular plunger relative to the rod. Therefore, it is possible to effectively increase the damping load generated when the rod is rapidly pushed into the sleeve.

It is preferable that a second leakage gap is defined between an outer periphery of the tubular plunger and the inner periphery of the sleeve.

If such a second leakage gap is defined, when the rod moves downwardly relative to the sleeve with the first leakage gap closed, oil in the pressure chamber flows out through the second leakage gap, and a damping load is generated due to the viscous resistance of the oil flowing in the second leakage gap. Namely, when the rod is rapidly pushed into the sleeve, it is possible to generate the damping load corresponding to the size of the second leakage gap.

It is preferable that the first leakage gap and the second leakage gap are configured such that the second leakage gap provides a higher oil flow resistance than the first leakage gap.

If the first and second leakage gaps are configured in this way, it is possible to effectively increase the damping load generated when the rod is rapidly pushed into the sleeve.

It is preferable that the hydraulic auto-tensioner further comprises a lower stopper configured to restrict a downwardly movable range of the tubular plunger relative to the rod, and a preload is applied between the tubular plunger and the lower stopper by a biasing force of the pressure regulating spring.

With this arrangement, the magnitude of the pressure in the pressure chamber when the tubular plunger begins to move upwardly relative to the rod while the rod is moving downwardly relative to the sleeve is adjustable to an optimal value by adjusting the magnitude of the preload applied between the tubular plunger and the lower stopper.

It is preferable that the tubular plunger includes an outwardly extending flange arranged on a portion of the tubular plunger protruding beyond the sleeve, and supporting a bottom end of the pressure regulating spring.

Such a flange can support the bottom end of the pressure regulating spring in a stable manner. As a result thereof, the tubular plunger can move upwardly in a stable manner relative to the rod while the rod is moving downwardly relative to the sleeve.

Effects of the Invention

If the hydraulic auto-tensioner of the present invention in a belt transmission device for a vehicle equipped with an ISG, during the steady operation of the engine during which the rod is displaced at a relatively small amplitude, it is possible to keep small the damping load generated in the hydraulic auto-tensioner, and thus to keep the tension of the belt small. On the other hand, when the engine is started by driving the ISG, and the rod is rapidly pushed into the sleeve, a large damping load is generated, thus effectively preventing the slippage of the belt.

DETAILED DESCRIPTION OF THE INVENTION

Figure 1:
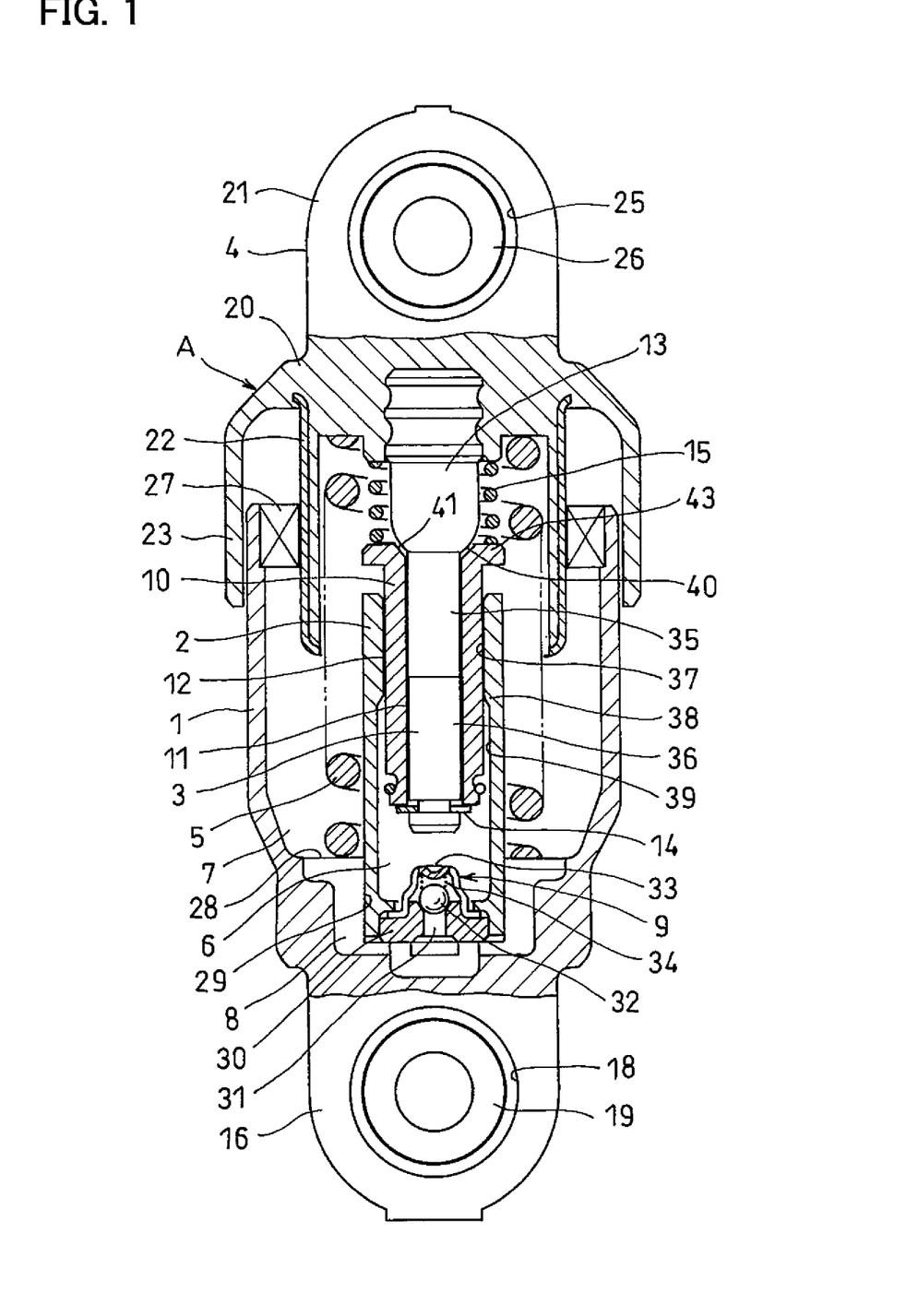
FIG. 1 is a sectional view of a hydraulic auto-tensioner embodying the present invention.

FIG. 1 illustrates a hydraulic auto-tensioner A embodying the present invention, which includes a tubular cylinder 1 having a bottom; a sleeve 2 fixed in the cylinder 1 so as to be coaxial with the cylinder 1; a rod 3 movably inserted in the sleeve 2; a spring seat 4 fixed to the portion of the rod 3 protruding beyond the sleeve 2; a return spring 5 configured to bias the spring seat 4 upwardly; a pressure chamber 6 defined in the sleeve 2; a reservoir chamber 7 defined outside of the sleeve 2; oil stored in the pressure chamber 6 and the reservoir chamber 7; oil passages 8 through which the lower portion of the pressure chamber 6 communicates with the lower portion of the reservoir chamber 7; a check valve 9 disposed at the ends of the oil passages 8 leading to the pressure chamber 6; a tubular plunger 10 vertically movably mounted between the outer periphery of the rod 3 and the inner periphery of the sleeve 2; a first leakage gap 11 defined between the inner periphery of the tubular plunger 10 and the outer periphery of the rod 3; a second leakage gap 12 defined between the outer periphery of the tubular plunger 10 and the inner periphery of the sleeve 2; an upper stopper 13 configured to restrict the upwardly movable range of the tubular plunger 10 relative to the rod 3; a lower stopper 14 configured to restrict the downwardly movable range of the tubular plunger 10 relative to the rod 3; and a pressure regulating spring 15 configured to bias the tubular plunger 10 downwardly.

The cylinder 1 is a tubular cylinder made of an aluminum alloy, and having an open top end, and a closed bottom end constituting the bottom of the cylinder. The cylinder 1 includes a lower coupling piece 16 integral with the bottom end of the cylinder 1 and having a through hole 18 through which a lower coupling shaft 17 (see FIGS. 5 and 6) is inserted. A bearing 19 is mounted in the through hole 18 so as to rotatably support the lower coupling shaft 17.

The spring seat 4 includes an end plate 20 supporting the top end of the return spring 5; an upper coupling piece 21 protruding upwardly from the end plate 20; an inner tubular portion 22 extending downwardly from the end plate 20 so as to be opposed to the inner diameter side of the cylinder 1; and an outer tubular portion 23 extending downwardly from the end plate 20 so as to be opposed to the outer diameter side of the cylinder 1. The upper coupling piece 21 has a through hole 25 through which an upper coupling shaft 24 (see FIGS. 5 and 6) is inserted. A bearing 26 is mounted in the through hole 25 so as to rotatably support the upper coupling shaft 24.

The spring seat 4 is made of synthetic resin. The top end of the rod 3 is fixed to the spring seat 4 by insert molding, specifically, by placing the top end of the rod 3 into a mold for forming the spring seat 4, and injecting resin into the mold.

An annular oil seal 27 is mounted to the inner periphery of the cylinder 1 at its upper portion while kept in sliding contact with the outer peripheral surface of the inner tubular portion 22 of the spring seat 4, thereby sealing the oil in the cylinder 1. The inner tubular portion 22 includes a thin-walled cylindrical member made of steel and kept in sliding contact with the oil seal 27. The thin-walled cylindrical member is fixedly attached to the resin part of the spring seat 4 by insert molding. The outer tubular portion 23 covers, from outside, the contact section of the inner tubular portion 22 with which the oil seal 27 is kept in sliding contact, and prevents the entry of foreign matter, thereby enabling the oil seal 27 to function in a reliable manner.

The return spring 5 is a compression coil spring arranged coaxially with the sleeve 2 and surrounding the outer periphery of the sleeve 2. The bottom end of the return spring 5 is supported by the bottom 28 of the cylinder 1, and the top end of the return spring 5 presses the spring seat 4 upwardly. The return spring 5 presses the spring seat 4 upwardly, thereby biasing the rod 3 in the direction in which the rod 3 protrudes beyond the sleeve 2. The upper portion of the return spring 5 is covered, from radially outside thereof, by the inner tubular portion 22 of the spring seat 4.

The sleeve 2 is made of steel, and vertically extends in the cylinder 1. The lower portion of the sleeve 2 is press-fitted in a sleeve fitting recess 29 formed in the bottom 28 of the cylinder 1. The reservoir chamber 7 is an annular chamber defined between the outer periphery of the sleeve 2 and the inner periphery of the cylinder 1, and containing air and hydraulic oil in two layers with the air forming the upper layer and the hydraulic oil forming the lower layer. The oil passages 8, through which the lower portion of the pressure chamber 6 communicates with the lower portion of the reservoir chamber 7, are formed between the fitting surfaces of the sleeve 2 and the sleeve fitting recess 29.

The check valve 9 is mounted to the bottom end of the sleeve 2 so as to allow oil to flow, through the oil passages 8, only from the reservoir chamber 7 to the pressure chamber 6, and includes a valve seat 30 press-fitted in the bottom end of the sleeve 2; a valve hole 31 vertically extending through the center of the valve seat 30; a check ball 32 movable between the opened position at which the valve hole 31 is opened by the upward movement of the check ball 32 away from the valve seat 30, and the closed position at which the valve hole 31 is closed by the seating of the check ball 32 on the valve seat 30; a retainer 33 configured to restrict the movement range/stroke of the check ball 32; and a valve spring 34 configured to bias the check ball 32 downwardly.

The check valve 9 is configured such that, when the pressure in the pressure chamber 6 exceeds the pressure in the reservoir chamber 7, the check ball 32 closes the valve hole 31, thereby preventing oil in the pressure chamber 6 from flowing into the reservoir chamber 7 through the oil passages 8, and also configured such that, when the pressure in the pressure chamber 6 falls below the pressure in the reservoir chamber 7, the check ball 32 opens the valve hole 31, thereby allowing oil in the reservoir chamber 7 to flow into the pressure chamber 6 through the oil passages 8.

The rod 3 is vertically movable relative to the sleeve 2 with the lower portion of the rod 3 inserted in the sleeve 2, and with the upper portion of the rod 3 protruding beyond the sleeve 2. The tubular plunger 10 is vertically slidably fitted on the outer periphery of the rod 3. The rod 3 has, on its portion on which the tubular plunger 10 is fitted, a small outer diameter surface 35, and a large outer diameter surface 36 arranged below, and continuous with, the small outer diameter surface 35. The small and large outer diameter surfaces 35 and 36 are both cylindrical surfaces, and the large outer diameter surface 36 has an outer diameter slightly larger than the outer diameter of the small outer diameter surface 35. Also, the large outer diameter surface 36 is a finished surface having a surface roughness smaller than the surface roughness of the small outer diameter surface 35.

The tubular plunger 10 is vertically slidably inserted in the sleeve 2 with the upper portion of the tubular plunger 10 protruding beyond the sleeve 2. The sleeve 2 has, on its inner periphery, a small inner diameter surface 37, a step 38, and a large inner diameter surface 39 arranged below, and continuous through the step 38 with, the small inner diameter surface 37. The small and large inner diameter surfaces 37 and 39 are both cylindrical surfaces, and the small inner diameter surface 37 has an inner diameter slightly smaller than the inner diameter of the large inner diameter surface 39. Also, the small inner diameter surface 37 has a surface roughness smaller than the surface roughness of the large inner diameter surface 39.

The pressure chamber 6 is defined under the rod 3 and the tubular plunger 10. When the rod 3 moves upwardly relative to the sleeve 2, the volume of the pressure chamber 6 increases, whereas when the rod 3 moves downwardly relative to the sleeve 2, the volume of the pressure chamber 6 decreases. Also, when the tubular plunger 10 moves upwardly relative to the sleeve 2, the volume of the pressure chamber 6 increases, whereas when the tubular plunger 10 moves downwardly relative to the sleeve 2, the volume of the pressure chamber 6 decreases. The pressure chamber 6 is filled with oil so that no air enters the pressure chamber 6.

The first leakage gap 11 is defined between the outer periphery (large outer diameter surface 36) of the rod 3 and the inner periphery of the tubular plunger 10 so that oil in the pressure chamber 6 is allowed to leak out through the first leakage gap 11. The second leakage gap 12 is defined between the outer periphery of the tubular plunger 10 and the inner periphery (small inner diameter surface 37) of the sleeve 2 so that oil in the pressure chamber 6 is allowed to leak out through the second leakage gap 12. The second leakage gap 12 is narrower than the first leakage gap 11 so that that the second leakage gap 12 provides a higher oil flow resistance than the first leakage gap 11. The size of the first leakage gap 11 is set to be, e.g., 20 to 50 μm, whereas the size of the second leakage gap 12 is set to be, e.g., 10 to 20 μm.

The upper stopper 13 is a large diameter shaft having an outer diameter larger than the inner diameter of the tubular plunger 10, and configured to abut and support the top end of the tubular plunger 10 when the tubular plunger 10 moves upwardly relative to the rod 3, thereby preventing the tubular plunger 10 from moving further upwardly relative to the rod 3.

The upper stopper 13 has a seat surface 40 located upwardly of and opposed to the tubular portion 10. The tubular plunger 10 has a seat surface 41 formed on the inner periphery of the plunger 10 at its top end, and configured to abut against the seat surface 40 of the upper stopper 13 when the tubular plunger 10 moves upwardly relative to the rod 3. The seat surface 40 and 41 are shaped such that the seat surfaces 40 and 41 are capable of liquid-tightly closing the outlet of the first leakage gap 11 when the seat surfaces 40 and 41 come into contact with each other. For example, the seat surface 41 of the tubular plunger 10 may be tapered such that the diameter of the seat surface 41 gradually decreases toward the lower end thereof, whereas the seat surface 40 of the upper stopper 13 may be a downwardly convex spherical surface. The upper stopper 13 and the tubular plunger 10 constitute an on-off valve configured to open the first leakage gap 11 when the tubular plunger 10 is separated from the upper stopper 13, and close the first leakage gap 11 when the tubular plunger 10 is brought into abutment with the upper stopper 13.

The seat surface 40 of the upper stopper 13 is subjected to surface hardening treatment such that its hardness is higher than the hardness of the inside of the rod 3. Similarly, the seat surface 41 of the tubular plunger 10 is also subjected to surface hardening treatment such that its hardness is higher than the hardness of the inside of the tubular plunger 10. For example, the seat surfaces 40 and 41 are each covered by a hard film, such as a diamond-like carbon (DLC) film.

Figure 2:
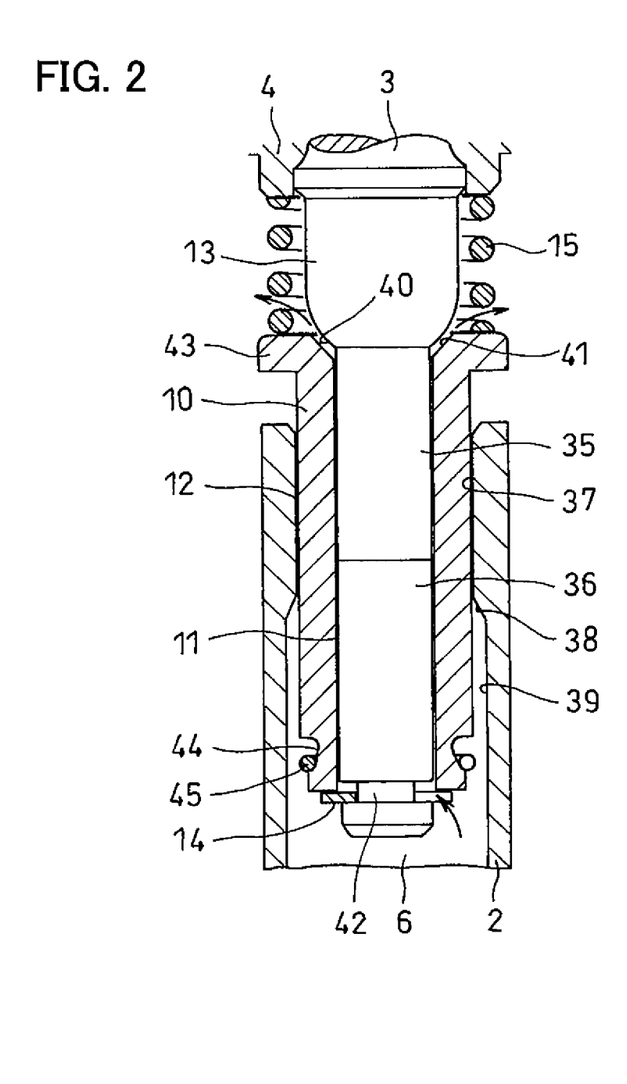
FIG. 2 is an enlarged view of the portion of the hydraulic auto-tensioner in the vicinity of the tubular plunger illustrated in FIG. 1, the view illustrating the state in which oil in a pressure chamber is leaking out through a first leakage gap right after the pressure in the pressure chamber began to increase.

As illustrated in FIG. 2, the bottom end of the rod 3 protrudes downwardly beyond the bottom end of the tubular plunger 10, and a circumferential groove 42 is formed in the protruding bottom end of the rod 3. A snap ring as the lower stopper 14 for restricting the downwardly movable range of the tubular plunger 10 relative to the rod 3 is fitted in the circumferential groove 42. The snap ring is shaped such that even while supporting the tubular plunger 10, the snap ring does not completely close the inlet of the first leakage gap 11, and thus allows oil in the pressure chamber 6 to flow out through the first leakage gap 11 (i.e., shaped such that even when the tubular plunger 10 abuts against the lower stopper 14, the pressure chamber 6 still communicates with the first leakage gap 11). The snap ring having such a shape may be a C-shaped snap ring, which has circumferentially separated ends, or, instead of a C-shaped snap ring, a ring including a circular annular portion, and a plurality of internal teeth radially inwardly extending from the circular annular portion while being circumferentially spaced apart from each other such that the distal ends of the internal teeth are engaged in the circumferential groove 42.

The pressure regulating spring 15 is a coil spring constituted by a helically extending wire rod, and arranged above the tubular plunger 10 so as to surround the outer periphery of the rod 3. The top end of the pressure regulating spring 15 is supported by the spring seat 4. The bottom end of the pressure regulating spring 15 is supported by an outwardly extending flange 43 formed on the portion of the tubular plunger 10 protruding beyond the sleeve 2. The pressure regulating spring 15 has an inner diameter larger than the outer diameter of the upper stopper 13.

A preload is applied between the tubular plunger 10 and the lower stopper 14 by the biasing force of the pressure regulating spring 15. Namely, the pressure regulating spring 15 is compressed to a predetermined length from the no-load condition beforehand, i.e., from the state in which no external load is applied thereto, and then is mounted into the tensioner. Therefore, with the tubular plunger 10 at the lower limit of its movable range relative to the rod 3, the length of the pressure regulating spring 15 is shorter than the length of the pressure regulating spring 15 in its natural state, and this length is set to be 5 or more times longer than the vertically movable stroke of the tubular plunger 10 relative to the rod 3. While the pressure regulating spring 15 is a coil spring in the embodiment, the pressure regulating spring 15 may be another spring (such as a washer assembly constituted by wave washers and flat washers disposed between the respective adjacent pairs of wave washers).

A tapered groove 44 is provided in the outer periphery of the lower portion of the tubular plunger 10, and includes a bottom surface tapered such that the tapered groove 44 becomes gradually shallow toward the lower end thereof. An anti-separation ring 45 is fitted in the tapered groove 44 such that the bottom surface of the tapered groove 44 at its lower end restricts the deformation of the anti-separation ring 45 such that its diameter decreases. The anti-separation ring 45 prevents the tubular plunger 10 from being pulled out of the sleeve 2 by engaging the step 38 on the inner periphery of the sleeve 2.

The hydraulic auto-tensioner A of the present invention can be mounted, e.g., to the belt transmission device illustrated in FIGS. 5 and 6, which is used in a vehicle equipped with an integrated starter generator (ISG).

The belt transmission device of FIGS. 5 and 6 includes a crank pulley 51 mounted to a crankshaft 50; an ISG pulley 54 mounted to the rotary shaft 53 of the ISG 52; an engine accessory pulley 57 mounted to the rotary shaft 56 of an engine accessory 55 such as a water pump; a belt 58 trained around these pulleys 51, 54 and 57; and a tension adjusting device 60 keeping the tension of the belt 58 in an appropriate range. The ISG 52 is an engine accessory functioning as a generator to generate electricity from the driving force of the crankshaft 50 while the engine is running in a steady operation, and functioning as an electric motor (starter) to forcibly rotate the crankshaft 50, kept at a standstill, to start the engine.

The tension adjusting device 60 includes a tension pulley 61 kept in contact with the belt 58 on the downstream side of the crank pulley 51 and on the upstream side of the ISG pulley 54; a pulley arm 62 supporting the tension pulley 61; and the hydraulic auto-tensioner A of the present invention, which is configured to bias the pulley arm 62 in the direction in which the tension pulley 61 is pressed against the belt 58.

The lower coupling piece 16 of the hydraulic auto-tensioner A is pivotally coupled to the pulley arm 62 through the lower coupling shaft 17. The upper coupling piece 21 of the hydraulic auto-tensioner A is pivotally coupled to an engine block 59 through the upper coupling shaft 24. The pulley arm 62 is supported to be pivotable about a fulcrum shaft 63 fixed to the engine block 59.

As illustrated in FIG. 5, while the engine is running in a steady operation, the crankshaft 50 rotates as a driving shaft such that the rotation of the crankshaft 50 is transmitted through the belt 58 to the pulleys 54 and 57, thereby rotating the rotary shaft 53 of the ISG 52, and the rotary shaft 56 of the engine accessory 55. At this time, the portion of the belt 58 where the tension adjusting device 60 is located is being pushed out from the driving pulley (crank pulley 51), and thus becomes the loose side of the belt 58.

While the engine is running in a steady operation, the tension of the belt 58 repeatedly increases and decreases. i.e., fluctuates at a predetermined frequency, and the rod 3 of the hydraulic auto-tensioner A is displaced at a relatively small amplitude in accordance with the tension fluctuations of the belt 58. Namely, since, while the engine is running in a steady operation, the rotation speed of the crankshaft 50 fluctuates due to the repeated combustion of the engine, and the rotation speed fluctuations of the crankshaft 50 are transmitted through the belt 58 to the hydraulic auto-tensioner A, the rod 3 of the hydraulic auto-tensioner A reciprocates vertically relative to the sleeve 2 at a relatively small amplitude. For example, if the engine is a general four-cylinder engine, when the engine revolves at 3,000 revolutions per minute, the rod 3 of the hydraulic auto-tensioner A reciprocates at the frequency of 100 Hz.

When the rod 3 moves downwardly relative to the sleeve 2, and the pressure in the pressure chamber 6 increases accordingly, the check valve 9 is closed, so that no oil flows into the oil passages 8. As a result thereof, as illustrated in FIG. 2, oil in the pressure chamber 6 flows out through the first leakage gap 11, and a damping load is generated due to the viscous resistance of the oil flowing in the first leakage gap 11. Right after the rod 3 begins to move downwardly relative to the sleeve 2, the pressure in the pressure chamber 6 begins to increase. However, when the rod 3 moves further downwardly relative to the sleeve 2, the upward pressure applied to the tubular plunger 10 from the oil in the pressure chamber 6 exceeds the downward biasing force applied to the tubular plunger 10 from the pressure regulating spring 15, and thus the tubular plunger 10 moves upwardly relative to the rod 3, thereby absorbing the pressure increase in the pressure chamber 6. Therefore, the damping load generated in the hydraulic auto-tensioner A is kept small.

On the other hand, when the rod 3 moves upwardly relative to the sleeve 2, and the pressure in the pressure chamber 6 decreases accordingly, the check valve 9 is opened, so that oil flows from the reservoir chamber 7 into the pressure chamber 6 through the oil passages 8, thereby enabling the rod 3 to move quickly.

As illustrated in FIG. 6, when the engine is started by driving the ISG 52, the rotary shaft 53 of the ISG 52 rotates as a driving shaft, and the rotation of the rotary shaft 53 is transmitted through the belt 58 to the pulley 51, thereby rotating the crankshaft 50. At this time, the portion of the belt 58 where the tension adjusting device 60 is located is being pulled by the driving pulley (ISG pulley 54), and thus becomes the tension side of the belt 58.

Figure 3:
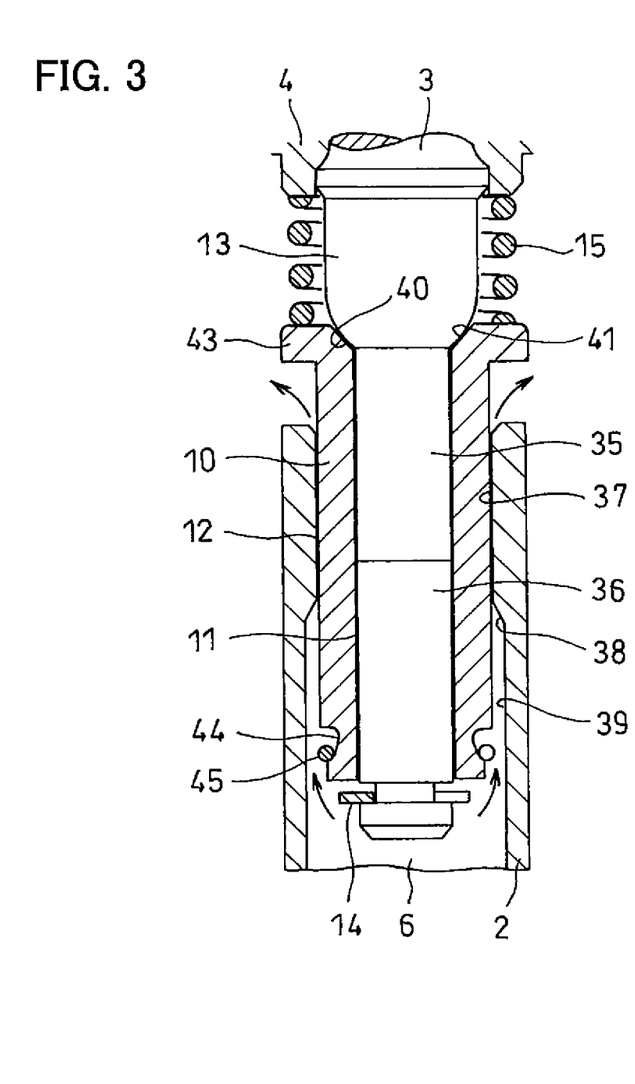
FIG. 3 is a view illustrating the state in which oil in the pressure chamber is leaking out through a second leakage gap with the tubular plunger kept in abutment with an upper stopper after the pressure in the pressure chamber illustrated in FIG. 2 further increased, and the tubular plunger moved upwardly relative to a rod.

When the engine is started by driving the ISG 52, the tension of the belt 58 increases rapidly, and thus the rod 3 of the hydraulic auto-tensioner A is rapidly pushed into the sleeve 2, so that, as illustrated in FIG. 3, the tubular plunger 10 moves to the upper limit of the movable range of the tubular plunger 10 relative to the rod 3. At this time, since any further upward movement of the tubular plunger 10 relative to the rod 3 is restricted, it is impossible to absorb the pressure increase in the pressure chamber 6. Also, at this time, since the seat surface 41 of the tubular plunger 10 is seated on the seat surface 40 of the upper stopper 13, thereby closing the outlet of the first leakage gap 11, oil in the pressure chamber 6 flows out through the second leakage gap 12, and a relatively large damping load is generated due to the viscous resistance of the oil flowing in the second leakage gap 12.

As described above, by using the hydraulic auto-tensioner A in a belt transmission device for a vehicle equipped with an ISG, during the steady operation of the engine during which the rod 3 is displaced at a relatively small amplitude, it is possible to keep small the damping load generated in the hydraulic auto-tensioner A, and thus to keep the tension of the belt 58 small. As a result thereof, it is possible to reduce the fuel consumption of the engine by reducing the energy loss generated by the friction between the belt 58 and the respective pulleys, and also to extend the service lives of such components as the belt 58 and the rolling bearings supporting the respective pulleys 51, 54, and 57. On the other hand, when the engine is started by driving the ISG 52, and the rod 3 is rapidly pushed into the sleeve 2, a large damping load is generated in the hydraulic auto-tensioner A, thus effectively preventing the slippage of the belt 58.

Since the hydraulic auto-tensioner A is configured such that, when the tubular plunger 10 moves to the upper limit of the movable range of the tubular plunger 10 relative to the rod 3, the seat surface 41 of the tubular plunger 10 abuts against the seat surface 40 of the upper stopper 13, and closes the first leakage gap 11 between the inner periphery of the tubular plunger 10 and the outer periphery of the rod 3, it is possible to effectively increase the damping load generated when the rod 3 is rapidly pushed into the sleeve 2.

Also, the hydraulic auto-tensioner A is configured such that, when the rod 3 moves downwardly relative to the sleeve 2 with the first leakage gap 11 closed, oil in the pressure chamber 6 flows out through the second leakage gap 12, and a damping load is generated due to the viscous resistance of the oil flowing in the second leakage gap 12. Since the second leakage gap 12 provides a higher oil flow resistance than the first leakage gap 11, it is possible to effectively increase the damping load generated when the rod 3 is rapidly pushed into the sleeve 2.

Also, the hydraulic auto-tensioner A is configured such that the magnitude of the pressure in the pressure chamber 6 when the tubular plunger 10 begins to move upwardly relative to the rod 3 while the rod 3 is moving downwardly relative to the sleeve 2 is adjustable to an optimum value by adjusting the magnitude of the preload applied between the tubular plunger 10 and the lower stopper 14.

Since the hydraulic auto-tensioner A includes an outwardly extending flange 43 formed on the portion of the tubular plunger 10 protruding beyond the sleeve 2 so as to support the bottom end of the pressure regulating spring 15, it is possible to support the bottom end of the pressure regulating spring 15 in a stable manner. As a result thereof, the tubular plunger 10 can move upwardly in a stable manner relative to the rod 3 while the rod 3 is moving downwardly relative to the sleeve 2.

Since the hydraulic auto-tensioner A includes a pressure regulating spring 15 surrounding the outer periphery of the rod 3, and thus having a relatively large diameter, it is possible to apply a stable biasing force to the tubular plunger 10, and thus to move the tubular plunger 10 upwardly relative to the rod 3 in a stable manner.

Since the pressure regulating spring 15 of the hydraulic auto-tensioner A is arranged between the top end surface of the tubular plunger 10 and the spring seat 4, which is located above this top end surface, the pressure regulating spring 15 is relatively long. As a result thereof, it is possible to apply a stable biasing force to the tubular plunger 10 over the entire range of the vertically movable stroke of the tubular plunger 10 relative to the rod 3.

Since, in the hydraulic auto-tensioner A, a small outer diameter surface 35, and a large outer diameter surface 36 arranged below, and continuous with, the small outer diameter surface 35 are formed on the portion of the rod 3 fitted in the tubular plunger 10 to define a first leakage gap 11 between the large outer diameter surface 36 and the inner periphery of the tubular plunger 10, it is possible to ensure a stable damping load while reducing the costs for shaping the outer periphery of the rod 3, compared to the case where the rod 3 has an equal outer diameter over the entire length of the portion of the rod 3 fitted in the tubular plunger 10.

Figure 4:
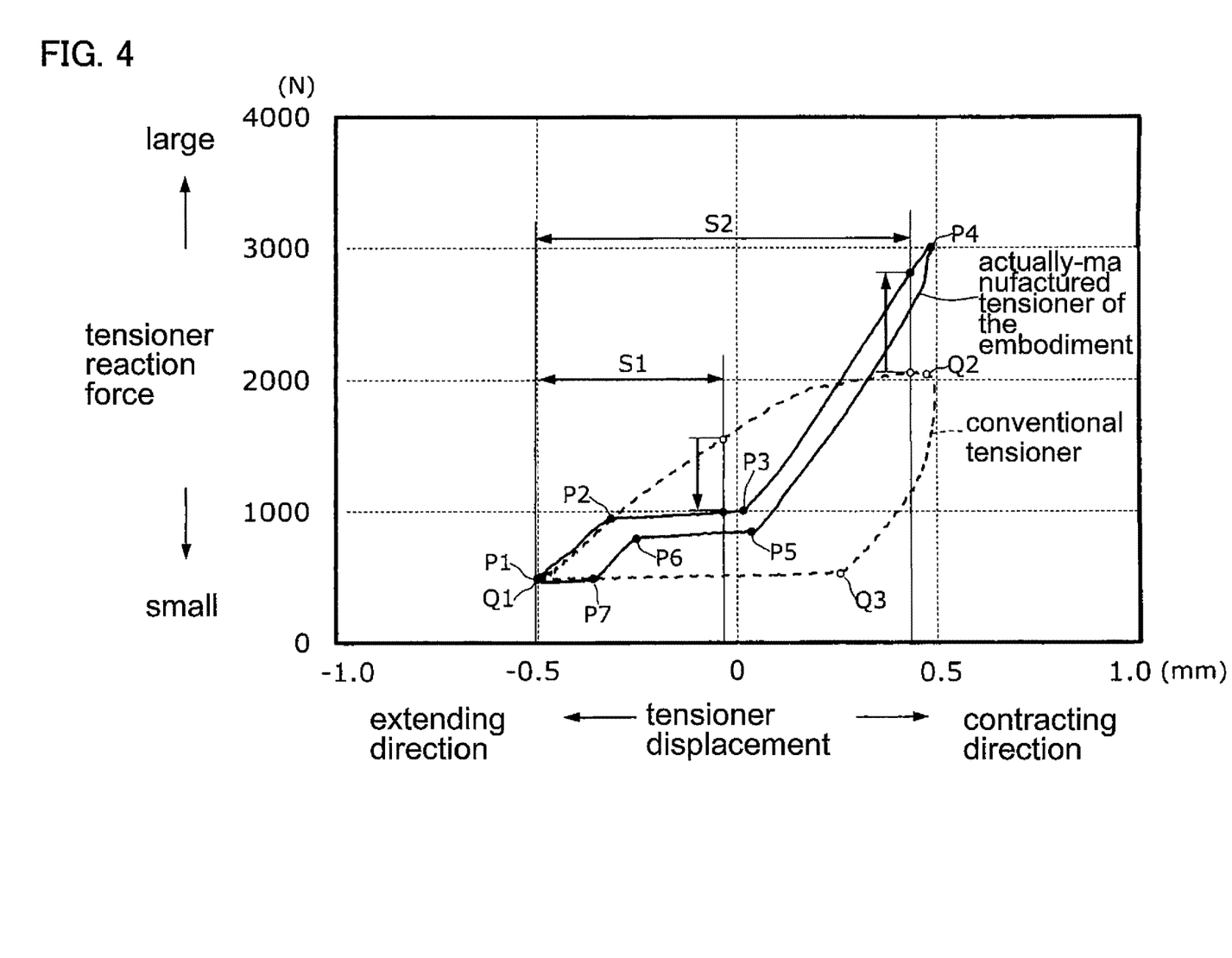
FIG. 4 is a graph exemplifying measurement results relating to the reaction force characteristics of the hydraulic auto-tensioner of FIG. 1, and a conventional hydraulic auto-tensioner.

FIG. 4 illustrates measurement results in which the reaction force characteristics of a hydraulic auto-tensioner A actually manufactured according to the above embodiment (hereinafter referred to as "the actually-manufactured tensioner of the embodiment") are compared to the reaction force characteristics of a conventional hydraulic auto-tensioner (hereinafter referred to as "the conventional tensioner").

The actually-manufactured tensioner of the embodiment is the hydraulic auto-tensioner A of FIG. 1. For this tensioner (as well as for the conventional tensioner), a change in the upward force applied to the spring seat 4 (tensioner reaction force) was measured when the spring seat 4 is vibrated vertically with the cylinder 1 fixed in position.

The conventional tensioner is the tensioner of FIG. 1 of the JP '757 reference discussed above (i.e., a tensioner not including members corresponding to the tubular plunger 10 and the pressure regulating spring 15, and configured such that the rod slides directly on the sleeve).

The vibration conditions were set as follows:
Control method: displacement control
Vibration waveform: sine wave
Vibration frequency: 10 Hz The "displacement control" is a control method by which the displacement of the spring seat 4 is controlled such that, irrespective of how the force applied to the spring seat 4 (tensioner reaction force) increases and decreases, the position of the spring seat 4 forms a sine wave as time passes. The vibration amplitude was set to be ±0.5 mm, which is larger than the amplitude of vibration ordinarily applied to the tensioner while the engine is running in a steady operation (e.g., about ±0.1 mm to ±0.2 mm). The actually-manufactured tensioner of the embodiment and the conventional tensioner both used a return spring 5 having a spring coefficient of about 35 N/mm.

FIG. 4 illustrates the relationship between the tensioner displacement (downward displacement of the spring seat 4) and the tensioner reaction force (upward force applied to the spring seat 4, which is the sum of the biasing forces of the return spring 5 and the pressure regulating spring 15, and the damping load generated in the tensioner), obtained by the above vibration experiment.

As illustrated in FIG. 4, while the actually-manufactured tensioner of the embodiment is being contracted, the tensioner reaction force changes in three stages, i.e., changes rapidly, slowly, and rapidly. Namely, while the actually-manufactured tensioner of the embodiment is being contracted, the tensioner reaction force increases relatively rapidly in the first stage (from initial point P1, where the tensioner reaction force is minimum, to point P2); hardly increases, i.e., remains substantially unchanged in the second stage (from point P2 to point P3); and increases relatively rapidly in the third stage (from point P3 to point P4, where the tensioner reaction force is maximum).

Thereafter, while the actually-manufactured tensioner of the embodiment is being extended, the tensioner reaction force changes in four stages, i.e., changes rapidly, slowly, rapidly, and then slowly. Namely, while the actually-manufactured tensioner of the embodiment is being extended, the tensioner reaction force decreases relatively rapidly in the first stage (from point P4, where the tensioner reaction force is maximum, to point P5); hardly decreases, i.e., remains substantially unchanged in the second stage (from point P5 to point P6); decreases relatively rapidly in the third stage (from point P6 to point P7); and hardly decreases, i.e., remains substantially unchanged in the fourth stage (from point P7 to point P1, where the tensioner reaction force is minimum).

On the other hand, while the conventional tensioner is being contracted, the tensioner reaction force increases substantially linearly from the minimum value (point Q1) to the maximum value (point Q2). While the conventional tensioner is being extended, the tensioner reaction force changes in two stages, i.e., changes rapidly and then slowly. Namely, while the conventional tensioner is being extended, the tensioner reaction force decreases relatively rapidly in the first stage (from initial point Q2, where the tensioner reaction force is maximum, to point Q3); and hardly decreases, i.e., remains substantially unchanged in the second stage (from Q3 to Q1, where the tensioner reaction force is minimum).

Namely, the actually-manufactured tensioner of the embodiment shows reaction force characteristics in which while the tensioner is being contracted, the rate at which the tensioner reaction force increases changes from high to low at point P2, and then changes from low to high at point P3; and in which while the tensioner is being extended, the rate at which the tensioner reaction force decreases changes from high to low at point P5, then changes from low to high at point P6, and finally changes from high to low at point P7.

Referring now to FIGS. 1 to 4, it is described why the actually-manufactured tensioner of the embodiment shows the reaction force characteristics described above.

<Points P1 to P2>

While positioned as shown in FIG. 2, the rod 3 begins to move downwardly relative to the sleeve 2. At this time, since the tubular plunger 10 is biased downwardly by the pressure regulating spring 15, and pressed against the lower stopper 14, the tubular plunger 10 also moves downwardly together with the rod 3. When the tubular plunger 10 and the rod 3 move downwardly together, oil in the pressure chamber 6 partially flows out through the first leakage gap 11, and the oil in the pressure chamber 6 is compressed. When the oil in the pressure chamber 6 is compressed, the oil pressure in the pressure chamber 6 increases, so that the tensioner reaction force increases relatively rapidly (see the interval between points P1 and P2 in FIG. 4) until, at point P2 in FIG. 4, the upward pressure applied to the tubular plunger 10 from the oil in the pressure chamber 6 becomes equal to the downward biasing force applied to the tubular plunger 10 from the pressure regulating spring 15.

<Points P2 to P3>

While positioned as shown in FIG. 2, the rod 3 moves further downwardly. At this time, since the upward pressure applied to the tubular plunger 10 from the oil in the pressure chamber 6 exceeds the downward biasing force applied to the tubular plunger 10 from the pressure regulating spring 15, the tubular plunger 10 moves upwardly relative to the sleeve 2. During this period, the pressure in the pressure chamber 6 hardly increases due to the upward movement of the tubular plunger 10, so that the tensioner reaction force is kept substantially constant (see the interval between points P2 and P3 in FIG. 4). Namely, since the tubular plunger 10 moves upwardly as the rod 3 moves downwardly, the volume of the pressure chamber 6 hardly changes, so that the pressure in the pressure chamber 6 is kept substantially constant. At this time, since the volume of the pressure chamber 6 hardly changes, oil hardly flows through the first and second leakage gaps 11 and 12. Then, at point P3 in FIG. 4, as illustrated in FIG. 3, the tubular plunger 10 is caught by the upper stopper 13, and stops moving upwardly.

<Points P3 to P4>

While positioned as shown in FIG. 3, the rod 3 moves further downwardly. At this time, since the tubular plunger 10 is caught by the upper stopper 13 as illustrated in FIG. 3, the tubular plunger 10 also moves downwardly together with the rod 3. When the tubular plunger 10 and the rod 3 move downwardly together, the oil in the pressure chamber 6 is further compressed, so that the oil pressure in the pressure chamber 6 increases again, and thus the tensioner reaction force increases rapidly again (see the interval between points P3 and P4 in FIG. 4). At this time, since the seat surface 41 of the tubular plunger 10 is seated on the seat surface 40 of the upper stopper 13 as illustrated in FIG. 3, oil in the pressure chamber 6 does not flow through the first leakage gap 11, but partially flows out through the second leakage gap 12.

<Points P4 to P5>

While positioned as shown in FIG. 3, the rod 3 begins to move upwardly. At this time, since the upward pressure applied to the tubular plunger 10 from the oil in the pressure chamber 6 is higher than the downward biasing force applied to the tubular plunger 10 from the pressure regulating spring 15, the tubular plunger 10 also moves upwardly together with the rod 3. When the tubular plunger 10 and the rod 3 move upwardly together, the compression of the oil in the pressure chamber 6 is gradually released, so that the oil pressure in the pressure chamber 6 decreases, and thus the tensioner reaction force decreases relatively rapidly (see the interval between points P4 and P5 in FIG. 4). At this time, due to the released compression (i.e., expansion) of the oil in the pressure chamber 6, the volume of the oil in the pressure chamber 6 increases, so that oil hardly flows through the second leakage gap 12. Also, since the seat surface 41 of the tubular plunger 10 is seated on the seat surface 40 of the upper stopper 13 as illustrated in FIG. 3, no oil flows through the first leakage gap 11, either. Then, at point P5 in FIG. 4, the upward pressure applied to the tubular plunger 10 from the oil in the pressure chamber 6 becomes equal to the downward biasing force applied to the tubular plunger 10 from the pressure regulating spring 15.

<Points P5 to P6>

While positioned as shown in FIG. 3, the rod 3 moves further upwardly. At this time, the upward pressure applied to the tubular plunger 10 from the oil in the pressure chamber 6 falls below the downward biasing force applied to the tubular plunger 10 from the pressure regulating spring 15, so that the tubular plunger 10 moves downwardly relative to the sleeve 2. During this period, the pressure in the pressure chamber 6 hardly decreases due to the downward movement of the tubular plunger 10, so that the tensioner reaction force is kept substantially constant (see the interval between points P5 and P6 in FIG. 4). Namely, since the tubular plunger 10 moves downwardly as the rod 3 moves upwardly, the volume of the pressure chamber 6 hardly changes, so that the pressure in the pressure chamber 6 is kept substantially constant. Then, at point P6 in FIG. 4, as illustrated in FIG. 2, the tubular plunger 10 is caught by the lower stopper 14, and stops moving downwardly.

<Points P6 to P7>

While positioned as shown in FIG. 2, the rod 3 moves further upwardly. At this time, since the downward movement of the tubular plunger 10 relative to the rod 3 is prevented by the lower stopper 14 as illustrated in FIG. 2, the tubular plunger 10 also moves upwardly together with the rod 3. When the tubular plunger 10 and the rod 3 move upwardly together, the compression of the oil in the pressure chamber 6 is further released, so that the oil pressure in the pressure chamber 6 begins to decrease again, and thus the tensioner reaction force decreases rapidly again (see the interval between points P6 and P7 in FIG. 4). At this time, as in the interval between points P4 and P5, due to the released compression (i.e., expansion) of the oil in the pressure chamber 6, the volume of the oil in the pressure chamber 6 increases, so that oil hardly flows through the first and second leakage gaps 11 and 12. The oil pressure in the pressure chamber 6 illustrated in FIG. 1 decreases until, at point P7 in FIG. 4, this oil pressure becomes equal to the oil pressure in the reservoir chamber 7, i.e., the compression of the oil in the pressure chamber 6 is completely released.

<Points P7 to P1>

While positioned as shown in FIG. 1, the rod 3 moves further upwardly. At this time, since the downward movement of the tubular plunger 10 relative to the rod 3 is prevented by the lower stopper 14, the tubular plunger 10 also moves upwardly together with the rod 3. When the tubular plunger 10 and the rod 3 move upwardly together, the oil pressure in the pressure chamber 6 falls below the oil pressure in the reservoir chamber 7, so that the check valve 9 is opened, and oil flows from the reservoir chamber 7 into the pressure chamber 6 through the oil passages 8. Therefore, the oil pressure in the pressure chamber 6 hardly changes, so that the tensioner reaction force is kept substantially constant (see the interval between points P7 and P1 in FIG. 4).

As described above, while the actually-manufactured tensioner A of the embodiment is being contracted, when the tensioner reaction force reaches a predetermined value (value at point P2 in FIG. 4), the tubular plunger 10 begins to move upwardly so as to absorb a change in the volume of the pressure chamber 6, so that while the tubular plunger 10 is moving upwardly, the tensioner reaction force is kept substantially constant (see the interval between points P2 and P3 in FIG. 4). Therefore, the actually-manufactured tensioner of the embodiment shows reaction force characteristics in which while the tensioner is being contracted, the rate at which the tensioner reaction force increases changes first from high to low at point P2, and then changes from low to high at point P3.

Also, while the actually-manufactured tensioner A of the embodiment is being extended, when the tensioner reaction force reaches a predetermined value (value at point P5 in FIG. 4), the tubular plunger 10 begins to move downwardly so as to absorb a change in the volume of the pressure chamber 6, so that while the tubular plunger 10 is moving downwardly, the tensioner reaction force is kept substantially constant (see the interval between points P5 and P6 in FIG. 4). Therefore, the actually-manufactured tensioner of the embodiment shows reaction force characteristics in which while the tensioner is being extended, the rate at which the tensioner reaction force decreases changes first from high to low at point P5, and then from low to high at point P6.

Since the actually-manufactured tensioner A of the embodiment shows the above-described reaction force characteristics, while the engine is running in a steady operation, it is possible to keep the tensioner reaction force small, and thus to keep small the tension applied to the belt 58 by the tension pulley 61 illustrated in FIG. 5, whereas when the engine is started by driving the ISG 52, it is possible to generate a large tensioner reaction force, and thus to effectively prevent the slippage between the belt 58 and the respective pulleys 51, 54, and 57 illustrated in FIG. 6.

Namely, while the engine is running in a steady operation, as illustrated by symbol S1 in FIG. 4, the actually-manufactured tensioner of the embodiment is displaced at an amplitude smaller than ±0.5 mm (e.g., amplitude of about ±0.1 mm to ±0.2 mm). Thus, while the actually-manufactured tensioner of the embodiment is being contracted, the tensioner reaction force increases from initial point P1 to point P2, and further increases from point P2 to a point between points P2 and P3. Thereafter, while the actually-manufactured tensioner of the embodiment is being extended, the tensioner reaction force decreases from the above point between points P2 and P3 to a point between points P5 and P6, and further decreases from this point to point P6, to point P7, and then to point P1. In this way, by using the actually-manufactured tensioner of the embodiment, while the engine is running in a steady operation, the maximum value of the tensioner reaction force can be limited to a value corresponding to a point between points P2 and P3, so that it is possible to keep small the tension applied to the belt 58 by the tension pulley 61 illustrated in FIG. 5, and thus to reduce the fuel consumption of the engine.

On the other hand, when the engine is started by driving the ISG 52, as illustrated by symbol S2 in FIG. 4, the actually-manufactured tensioner of the embodiment is contracted to the maximum amplitude value of ±0.5 mm or a value close to this maximum value. At this time, the tensioner reaction force increases to P4 or a point close to point P4. Therefore, when the engine is started by driving the ISG 52, it is possible to generate a large tensioner reaction force, and thus to effectively prevent the slippage between the belt 58 and the respective pulleys 51, 54 and 57 illustrated in FIG. 6.

In contrast thereto, if the conventional tensioner is used, while the engine is running in a steady operation, the tension of the belt 58 tends to be too large. Namely, when the conventional tensioner is displaced at the amplitude indicated by symbol S1 in FIG. 4, while the conventional tensioner is being contracted, the tensioner reaction force increases from initial point Q1 to a point between points Q1 and Q2. When the conventional tensioner is extended thereafter, the tensioner reaction force decreases from the above point between points Q1 and Q2 to a point between points Q3 and Q1, and further decreases to point Q1. In this way, if the conventional tensioner is used, while the engine is running in a steady operation, the maximum value of the tensioner reaction force increases to a value corresponding to a point between points Q1 and Q2, so that the tension applied to the belt 58 by the tension pulley 61 illustrated in FIG. 5 tends to be too large, thus making it difficult to reduce the fuel consumption of the engine.

Also, if the conventional tensioner is used, when the engine is started by driving the ISG 52, it is difficult to generate a large tensioner reaction force. Namely, when, as illustrated by symbol S2 in FIG. 4, the conventional tensioner is contracted to the maximum amplitude value of ±0.5 mm or a value close to this maximum value, the tensioner reaction force increases only to Q2 or a point close to point Q2. Therefore, when the engine is started by driving the ISG 52, it is difficult to generate a large tensioner reaction force, so that slippage is likely to occur between the belt 58 and the respective pulleys 51, 54, and 57 illustrated in FIG. 6.

The above embodiment is merely an example in every respect, and the present invention is not limited to the above embodiment. Therefore, the scope of the present invention is indicated not by the above description but by the claims, and should be understood to include all modifications within the scope and the meaning equivalent to the scope of the claims.

DESCRIPTION OF REFERENCE NUMERALS

2: sleeve
3: rod
4: spring seat
5: return spring
6: pressure chamber
7: reservoir chamber
8: oil passage
9: check valve
10: tubular plunger
11: first leakage gap
12: second leakage gap
13: upper stopper
14: lower stopper
15: pressure regulating spring
43: flange
A: hydraulic auto-tensioner

The invention claimed is:

1. A hydraulic auto-tensioner comprising:
a sleeve which extends in a vertical direction;
a rod having a lower portion inserted in the sleeve, and an upper protruding portion protruding beyond the sleeve, the rod being vertically movable relative to the sleeve;
a spring seat fixed to the upper protruding portion of the rod;
a return spring configured to bias the spring seat upwardly;
a pressure chamber defined in the sleeve such that a volume of the pressure chamber increases as the rod moves upwardly relative to the sleeve, and such that the volume of the pressure chamber decreases as the rod moves downwardly relative to the sleeve;
a reservoir chamber defined outside of the sleeve;
oil stored in the pressure chamber and the reservoir chamber;
an oil passage through which a lower portion of the pressure chamber communicates with a lower portion of the reservoir chamber;
a check valve configured to allow oil to flow, through the oil passage, only from the reservoir chamber to the pressure chamber;
a tubular plunger vertically movably mounted between an outer periphery of the rod and an inner periphery of the sleeve such that the volume of the pressure chamber increases as the tubular plunger moves upwardly relative to the sleeve, and such that the volume of the pressure chamber decreases as the tubular plunger moves downwardly relative to the sleeve;
a first leakage gap defined between an inner periphery of the tubular plunger and the outer periphery of the rod;
an upper stopper configured to restrict an upwardly movable range of the tubular plunger relative to the rod; and
a pressure regulating spring disposed above the tubular plunger so as to surround the outer periphery of the rod, and configured to bias the tubular plunger downwardly.

2. The hydraulic auto-tensioner according to claim 1, wherein the upper stopper and the tubular plunge constitute an on-off valve configured to open the first leakage gap when the tubular plunger is separated from the upper stopper, and close the first leakage gap when the tubular plunger is in abutment with the upper stopper.

3. The hydraulic auto-tensioner according to claim 2, wherein a second leakage gap is defined between an outer periphery of the tubular plunger and the inner periphery of the sleeve.

4. The hydraulic auto-tensioner according to claim 3, wherein the first leakage gap and the second leakage gap are configured such that the second leakage gap provides a higher oil flow resistance than the first leakage gap.

5. The hydraulic auto-tensioner according to claim 1, further comprising a lower stopper configured to restrict a downwardly movable range of the tubular plunger relative to the rod,
wherein the pressure regulating spring is configured to apply a preload between the tubular plunger and the lower stopper by a biasing force of the pressure regulating spring.

6. The hydraulic auto-tensioner according to claim 1, wherein the tubular plunger includes an outwardly extending flange arranged on a portion of the tubular plunger protruding beyond the sleeve, and supporting a bottom end of the pressure regulating spring.

7. The hydraulic auto-tensioner according to claim 2, further comprising a lower stopper configured to restrict a downwardly movable range of the tubular plunger relative to the rod,
wherein the pressure regulating spring is configured to apply a preload between the tubular plunger and the lower stopper by a biasing force of the pressure regulating spring.

8. The hydraulic auto-tensioner according to claim 3, further comprising a lower stopper configured to restrict a downwardly movable range of the tubular plunger relative to the rod,
wherein the pressure regulating spring is configured to apply a preload between the tubular plunger and the lower stopper by a biasing force of the pressure regulating spring.

9. The hydraulic auto-tensioner according to claim 4, further comprising a lower stopper configured to restrict a downwardly movable range of the tubular plunger relative to the rod,
wherein the pressure regulating spring is configured to apply a preload between the tubular plunger and the lower stopper by a biasing force of the pressure regulating spring.

10. The hydraulic auto-tensioner according to claim 2, wherein the tubular plunger includes an outwardly extending flange arranged on a portion of the tubular plunger protruding beyond the sleeve, and supporting a bottom end of the pressure regulating spring.

11. The hydraulic auto-tensioner according to claim 3, wherein the tubular plunger includes an outwardly extending flange arranged on a portion of the tubular plunger protruding beyond the sleeve, and supporting a bottom end of the pressure regulating spring.

12. The hydraulic auto-tensioner according to claim 4, wherein the tubular plunger includes an outwardly extending flange arranged on a portion of the tubular plunger protruding beyond the sleeve, and supporting a bottom end of the pressure regulating spring.

13. The hydraulic auto-tensioner according to claim 5, wherein the tubular plunger includes an outwardly extending flange arranged on a portion of the tubular plunger protruding beyond the sleeve, and supporting a bottom end of the pressure regulating spring.

14. The hydraulic auto-tensioner according to claim 7, wherein the tubular plunger includes an outwardly extending flange arranged on a portion of the tubular plunger protruding beyond the sleeve, and supporting a bottom end of the pressure regulating spring.

15. The hydraulic auto-tensioner according to claim 8, wherein the tubular plunger includes an outwardly extending flange arranged on a portion of the tubular plunger protruding beyond the sleeve, and supporting a bottom end of the pressure regulating spring.

16. The hydraulic auto-tensioner according to claim 9, wherein the tubular plunger includes an outwardly extending flange arranged on a portion of the tubular plunger protruding beyond the sleeve, and supporting a bottom end of the pressure regulating spring.

* * * * *